(12) United States Patent
Zafeiropoulos (10) Patent No.: US 10,134,380 B2
(45) Date of Patent: Nov. 20, 2018

(54) NOISE AND VIBRATION SENSING

(71) Applicant: Harman Becker Automotive Systems GmbH, Karlsbad (DE)

(72) Inventor: Nikos Zafeiropoulos, Straubing (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 15/751,226

(22) PCT Filed: Jul. 4, 2016

(86) PCT No.: PCT/EP2016/065672
§ 371 (c)(1),
(2) Date: Feb. 8, 2018

(87) PCT Pub. No.: WO2017/025248
PCT Pub. Date: Feb. 16, 2017

(65) Prior Publication Data
US 2018/0233126 A1 Aug. 16, 2018

(30) Foreign Application Priority Data
Aug. 10, 2015 (EP) ...................... 15180384

(51) Int. Cl.
*G10K 11/16* (2006.01)
*G10K 11/178* (2006.01)
(Continued)

(52) U.S. Cl.
CPC ......... *G10K 11/17883* (2018.01); *G01H 1/00* (2013.01); *G01P 15/18* (2013.01);
(Continued)

(58) Field of Classification Search
CPC ....... G10K 11/17883; G10K 11/17857; G10K 2210/12821; G10K 2210/129;
(Continued)

(56) References Cited

U.S. PATENT DOCUMENTS 5,350,035 A * 9/1994 Bodier .................. B60B 39/025
180/197
6,193,303 B1 * 2/2001 Urushiyama ........... B60R 19/00
280/784

(Continued)

FOREIGN PATENT DOCUMENTS

EP 0434468 A2 12/1990
JP 2006293145 A 10/2006

*Primary Examiner* — Andrew L Sniezek
(74) *Attorney, Agent, or Firm* — Brooks Kushman P.C.

(57) ABSTRACT

A noise and vibration sensor arrangement which is configured to operate with a road noise control system, and includes four acceleration sensors each configured to generate at least one output signal representative of at least one of accelerations, motions and vibrations that act on the respective acceleration sensor. The arrangement includes a vehicle subframe structure having a shape that is axisymmetric to a first axis and that has a maximum extent along a second axis. The first and the second axis are perpendicular. The four sensors are attached to the subframe structure at positions that correspond to four corners of a virtual rectangle. The virtual rectangle has two perpendicular centerlines, one of the centerlines being in line with the first axis of the subframe structure. The extent of the virtual rectangle along the other centerline is less than fifty percent of the subframe structure's maximum extent along the second axis.

20 Claims, 4 Drawing Sheets

(51) Int. Cl.
*G01H 1/00* (2006.01)
*G01P 15/18* (2013.01)
(52) U.S. Cl.
CPC .. *G10K 11/17857* (2018.01); *G10K 2210/129* (2013.01); *G10K 2210/12821* (2013.01); *G10K 2210/3219* (2013.01); *G10K 2210/501* (2013.01)
(58) Field of Classification Search
CPC ..... G10K 2210/3219; G10K 2210/501; G01H 1/00; G01P 15/18
See application file for complete search history.

(56) References Cited

U.S. PATENT DOCUMENTS

| | | |
|---|---|---|
| 6,324,290 B1 | 11/2001 | Murakami et al. |
| 2011/0142248 A1 | 6/2011 | Sakamoto et al. |
| 2014/0348338 A1 | 11/2014 | Iwamoto et al. |

* cited by examiner

NOISE AND VIBRATION SENSING

CROSS-REFERENCE TO RELATED APPLICATION

This application is the U.S. national phase of PCT Application No. PCT/EP2016/065672 filed on Jul. 4, 2016, which claims priority to EP Patent Application No. 15180384.8 filed on Aug. 10, 2015, the disclosures of which are incorporated in their entirety by reference herein.

FIELD

The disclosure relates to noise and vibration sensor arrangements for road noise control systems, active road noise control systems and noise and vibration measurement methods.

BACKGROUND

Land based vehicles, when driven on roads and other surfaces, generate low frequency noise known as road noise. Even in modern vehicles, cabin occupants may be exposed to road noise that is transmitted through the structure, e.g. tires-suspension-body-cabin path, and through airborne paths, e.g. tires-body-cabin path, to the cabin. It is desirable to reduce the road noise experienced by cabin occupants. Active Noise, vibration, and harshness (NVH) control technologies, also known as active road noise control (RNC) systems, can be used to reduce these noise components without modifying the vehicle's structure such as in active vibration technologies. However, active sound technologies for road noise cancellation may require very specific noise and vibration (N&V) sensor arrangements throughout the vehicle structure in order to observe road noise related noise and vibration signals.

SUMMARY

An example noise and vibration sensor arrangement, which is configured to operate with an active road noise control system, includes (at least) four acceleration sensors each configured to generate at least one output signal representative of at least one of accelerations, motions and vibrations that act on the respective acceleration sensor. The arrangement further includes a vehicle subframe structure having a shape that is axisymmetric with regard to a first axis and that has a maximum extent along a second axis. The first axis and the second axis are perpendicular. The four acceleration sensors are attached to the subframe structure at positions that correspond to four corners of a virtual rectangle or virtual trapezoid. The virtual rectangle or virtual trapezoid has two perpendicular centerlines, one of the centerlines being in line with the first axis of the subframe structure. The maximum extent of the virtual rectangle or virtual trapezoid along the other centerline is less than fifty percent of the subframe structure's maximum extent along the second axis.

An example active road noise control system includes a noise and vibration sensor arrangement, an active road noise control module and at least one loudspeaker.

An example noise and vibration measurement method, which is configured to operate with an active road noise control system, includes generating at least four output signals representative of the accelerations that occur at four sensing positions on a vehicle subframe structure. The vehicle subframe structure has a shape that is axisymmetric with regard to a first axis and that has a maximum extent along a second axis, the first axis and the second axis being perpendicular. The four sensing positions on the subframe structure correspond to four corners of a virtual rectangle or virtual trapezoid. The virtual rectangle or virtual trapezoid has two perpendicular centerlines, one of the centerlines being in line with the first axis of the subframe structure. The maximum extent of the virtual rectangle or virtual trapezoid along the other centerline is less than fifty percent of the subframe structure's maximum extent along the second axis.

BRIEF DESCRIPTION OF THE DRAWINGS

The disclosure may be better understood by reading the following description of non-limiting embodiments to the attached drawings, in which like elements are referred to with like reference numbers, wherein below.

DETAILED DESCRIPTION

Noise and vibration sensors provide reference inputs to active RNC systems, e.g., multichannel feedforward active road noise control systems, as a basis for generating the anti-noise that reduces or cancels road noise. Noise and vibration sensors may include acceleration sensors such as accelerometers, force gauges, load cells, etc. For example, an accelerometer is a device that measures proper acceleration. Proper acceleration is not the same as coordinate acceleration, which is the rate of change of velocity. Single- and multi-axis models of accelerometers are available for detecting magnitude and direction of the proper acceleration, and can be used to sense orientation, coordinate acceleration, motion, vibration, and shock.

Airborne and structure-borne noise sources are monitored by the noise and vibration sensors, in order to provide the highest possible road noise reduction (cancellation) performance between 0 Hz and 1 kHz. For example, acceleration sensors used as input noise and vibration sensors may be disposed across the vehicle to monitor the structural behavior of the suspension and other axle components for global RNC. Above a frequency range that stretches from 0 Hz to approximately 500 Hz, acoustic sensors that measure the airborne road noise may be used as reference control inputs. Furthermore, two microphones may be placed in the headrest in close proximity of the passenger's ears to provide an error signal or error signals in case of binaural reduction or cancellation. The feedforward filters are tuned or adapted to achieve maximum noise reduction or noise cancellation at both ears.

Figure 1:
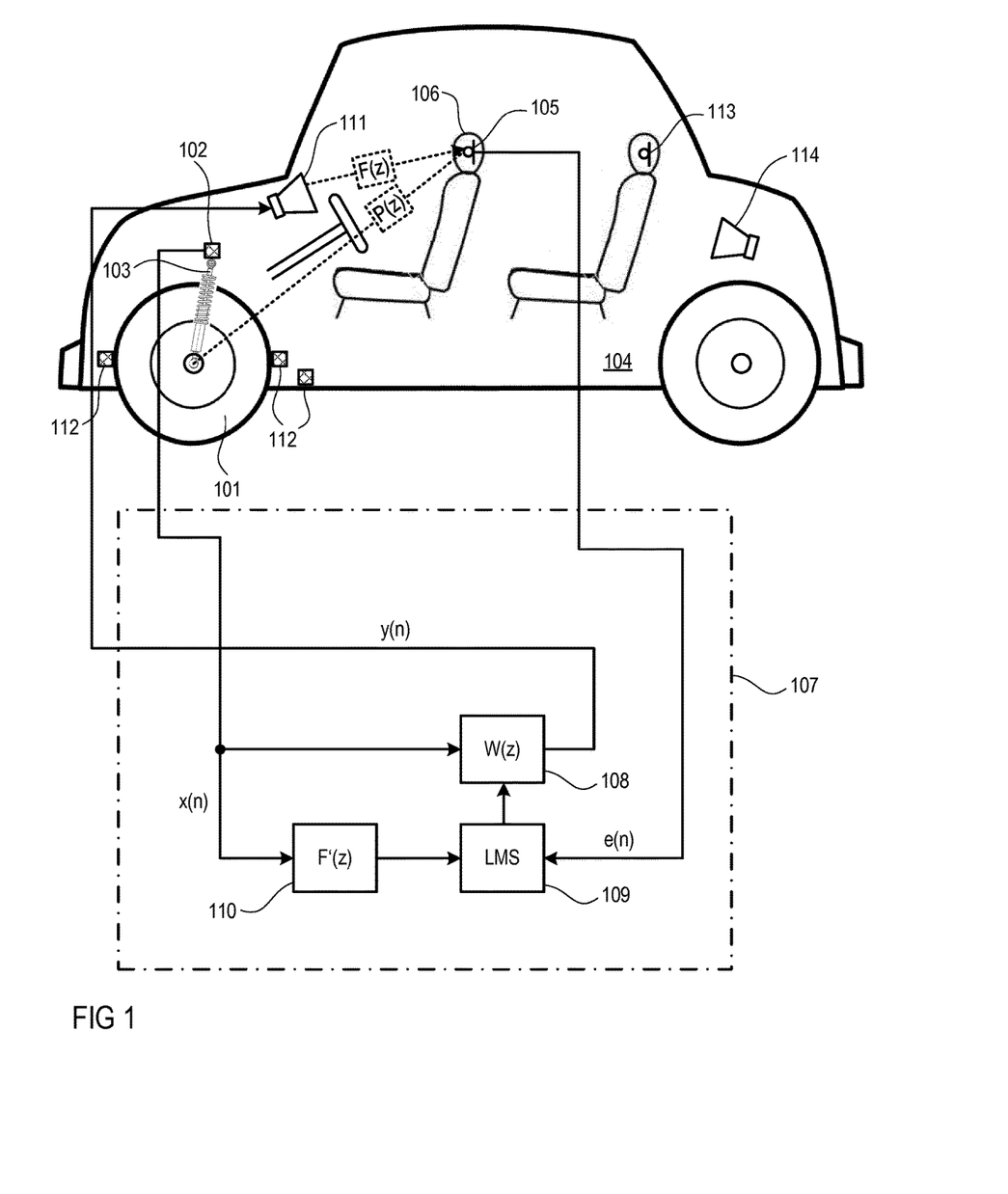
FIG. 1 is a schematic diagram illustrating an exemplary simple single-channel active road noise control system.

A simple single-channel feedforward active RNC system may be constructed as shown in FIG. 1. Vibrations that originate from a wheel 101 moving on a road surface are detected by a suspension acceleration sensor 102 which is mechanically coupled with a suspension device 103 of an automotive vehicle 104 and which outputs a noise and vibration signal x(n) that represents the detected vibrations and, thus, correlates with the road noise audible within the cabin. At the same time, an error signal e(n) representing noise present in the cabin of the vehicle 104 is detected by a microphone 105 arranged within the cabin in a headrest 106 of a seat (e.g., the driver's seat). The road noise originating from the wheel 101 is mechanically and/or acoustically transferred to the microphone 105 according to a transfer characteristic P(z).

A transfer characteristic W(z) of a controllable filter 108 is controlled by an adaptive filter controller 109 which may operate according to the known least mean square (LMS) algorithm based on the error signal e(n) and on the road noise signal x(n) filtered with a transfer characteristic F'(z) by a filter 110, wherein W(z)=−P(z)/F(z). F'(z)=F(z) and F(z) represents the transfer function between a loudspeaker and the microphone 105. A signal y(n) having a waveform inverse in phase to that of the road noise audible within the cabin is generated by an adaptive filter formed by controllable filter 108 and filter controller 109, based on the thus identified transfer characteristic W(z) and the noise and vibration signal x(n). From signal y(n) a waveform inverse in phase to that of the road noise audible within the cabin is then generated by the loudspeaker 111, which may be arranged in the cabin, to thereby reduce the road noise within the cabin. The exemplary system described above employs a straightforward single-channel feedforward filtered-x LMS control structure 107 for the sake of simplicity, but other control structures, e.g., multi-channel structures with a multiplicity of additional channels, a multiplicity of additional noise sensors 112, a multiplicity of additional microphones 113, and a multiplicity of additional loudspeakers 114, may be applied as well.

Figure 2:
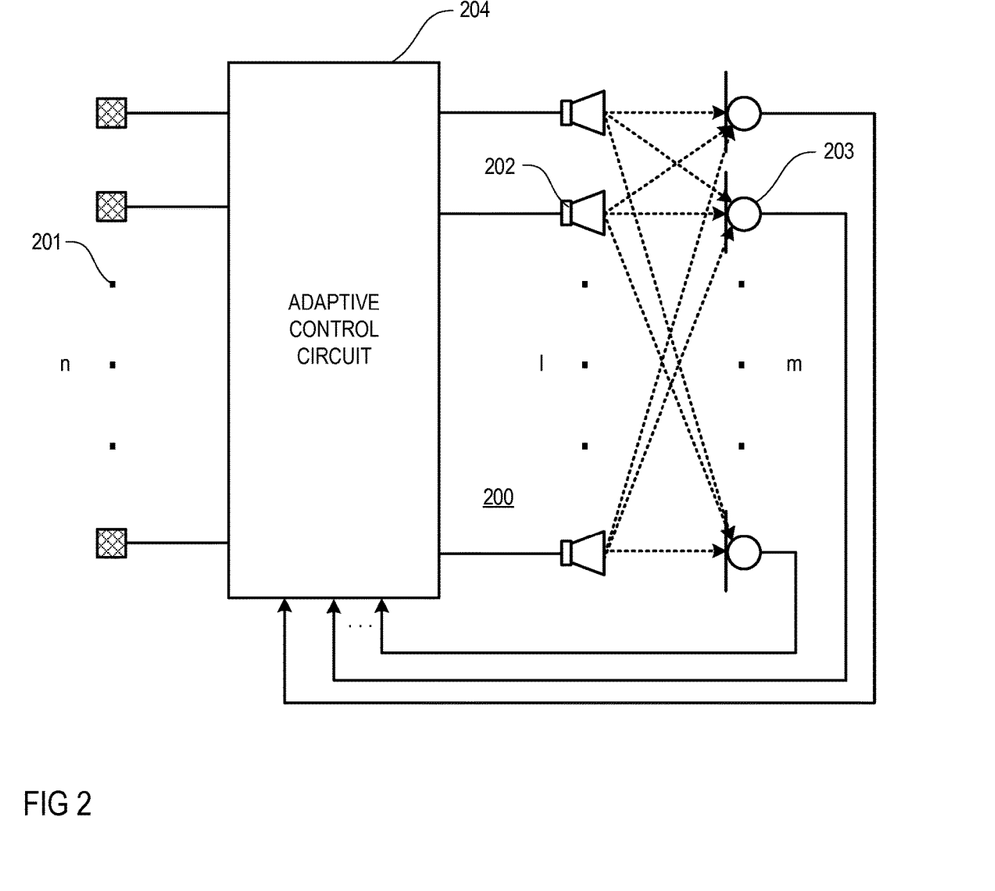
FIG. 2 is a schematic diagram illustrating an exemplary simple multi-channel active road noise control system.

FIG. 2 shows an active road noise control system 200 which is a multi-channel type active road noise control system capable of suppressing noise from a plurality of noise and vibration sources. The active road noise control system 200 comprises a multiplicity n of noise and vibration sensors 201, a multiplicity 1 of loudspeakers 202, a multiplicity m of microphones 203, and an adaptive control circuit 204 which operates to minimize the error between noise from the noise and vibration sources (primary noise) and cancelling noise (secondary noise). The adaptive control circuit 204 may include a number of control circuits provided for each of the loudspeakers 202, which create cancelling signals for cancelling noise from corresponding noise and vibration sources.

In conventional active RNC systems, the frequency of noise to be suppressed is limited to a low range. That is, conventional systems are not intended to suppress noise over its entire frequency range. Further, adaptive digital filters used in these systems have such characteristics as to be able to suppress only low frequency noise components, although processing noise over a wide frequency range is desired. In the active RNC systems disclosed herein, careful arrangement of the noise and vibration sensors allows for greater sensitivity and a broader operating frequency range for detecting vibrations occurring in the cabin that are related to road noise.

It has been found that (at least) four acceleration sensors, when used as noise and vibration sensors and attached to a vehicle subframe structure in a specific way, exhibit better results than acceleration sensors arranged in a conventional way. A subframe is a structural component of a vehicle, such as an automobile or an aircraft that uses a discrete, separate structure within a larger body-on-frame or unit body to carry certain components, such as the engine, drivetrain, or suspension. The subframe is bolted and/or welded to the vehicle. When bolted, it is sometimes equipped with rubber bushings or springs to dampen vibration. The principal purposes of using a subframe are to spread high chassis loads over a wide area of the relatively thin sheet metal of a monocoque body shell, and to isolate vibration and harshness from the rest of the body. For example, in an automobile with its powertrain contained in a subframe, forces generated by the engine and transmission can be dampened so that passengers experience less noise.

Figure 3:
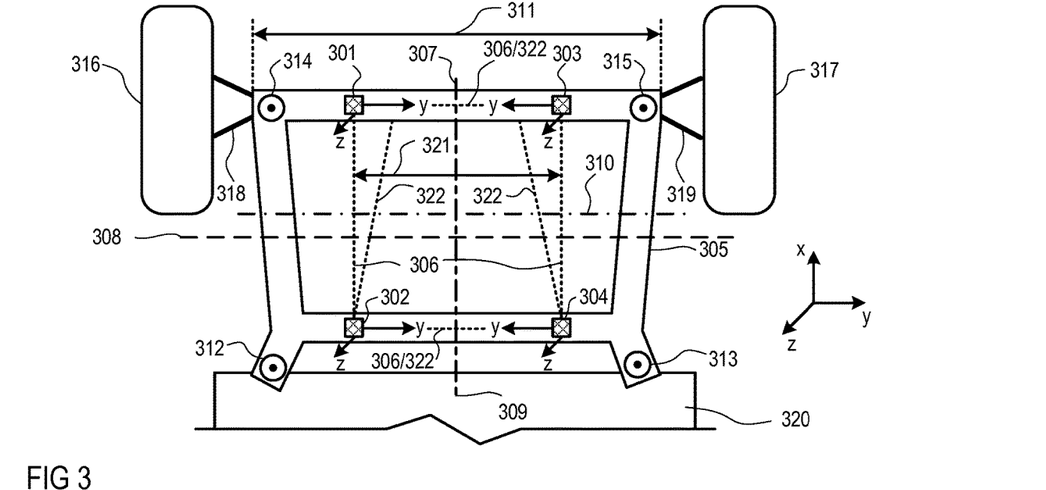
FIG. 3 is a schematic diagram illustrating a noise and vibration sensor arrangement applicable in the systems shown in FIGS. 1 and 2.

In the arrangement shown in FIG. 3, four acceleration sensors 301-304 are employed, each of which may be configured to generate at least one output signal representative of the acceleration that acts on the respective acceleration sensor in the axis in which the respective noise and vibration sensor is most sensitive. The acceleration sensors 301-304 are attached to a vehicle subframe structure 305 which has a shape that is axisymmetric with regard to a longitudinal axis 307 and that has a maximum extent along a lateral axis 308, wherein the lateral axis and the longitudinal axis are perpendicular. The acceleration sensors 301-304 are attached to the subframe structure 305 at positions that correspond to four corners of a virtual rectangle 306 or alternatively four corners of a virtual trapezoid 322 (as shown in FIG. 3 or shifted by 180°). The virtual rectangle 306 (or trapezoid 322) has two perpendicular centerlines 309 and 310. One of the centerlines 307 is in line with the longitudinal axis 309 of the subframe structure 305, and the (maximum) extent 321 of the virtual rectangle 306 or trapezoid 322 along the other centerline 310 is less than fifty percent of the subframe structure's maximum extent 311 along the lateral axis 308.

As shown in FIG. 3, the subframe structure may comprise mounts 312 and 313 for mounting the subframe structure 305 to a body structure 320 of the vehicle, and mounts 314 and 315 for mounting the subframe structure 305 to wheels 316 and 317 through control arms 318 and 319. In the example shown in FIG. 3, the acceleration sensors 301-304 are double-axis acceleration sensors having a first maximum sensitivity in a (vertical) axis z which may be perpendicular to the longitudinal axis 307 and perpendicular to the lateral axis 308, and a second maximum sensitivity in an axis y which may run along the lateral axis 308. A double-axis acceleration sensor as used herein may be a single sensor that is sensitive in two (perpendicular) axes or an array of two single-axis acceleration sensors that are arranged to be sensitive in two perpendicular axes.

However, in some cases different types of acceleration sensors may be used. At least one of the acceleration sensors 301-304 may be a single-axis acceleration sensor having a maximum sensitivity, e.g., in the axis x perpendicular to the longitudinal axis 307, and perpendicular to the lateral axis 308 or in an axis along the lateral axis 308. Furthermore, at least one of the four acceleration sensors 301-304 may be a triple-axis acceleration sensor, i.e., a single sensor that is sensitive in three perpendicular axes or an array of three single-axis acceleration sensors that are arranged to be sensitive in three perpendicular axes.

Figure 4:
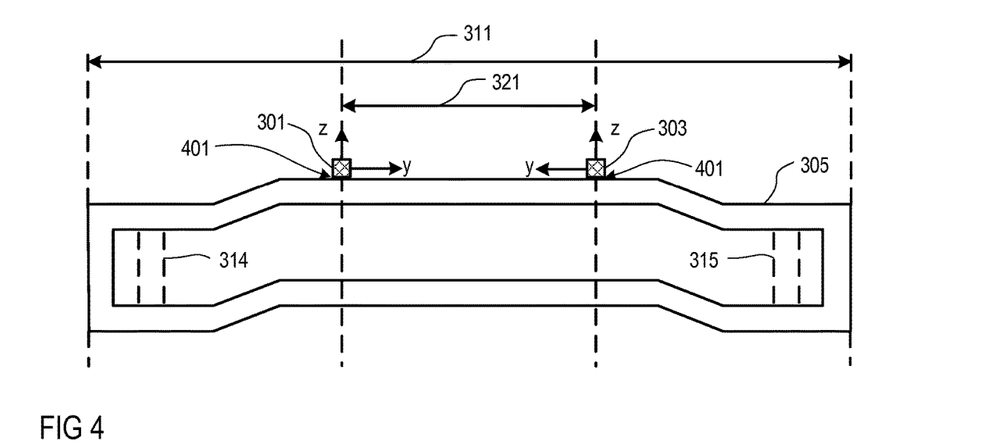
FIG. 4 is a side view of a part of a subframe structure applicable in the noise and vibration sensor arrangement shown in FIG. 3.

As shown in FIG. 4, the subframe structure 305 may comprise flat surfaces 401 at positions where at least two acceleration sensors 301 and 303 and/or acceleration sensors 302 and 304 of the four acceleration sensors 301-304 are attached to the subframe structure 305. The surfaces 401 may extend between the two acceleration sensors 301 and 303 and beyond. In addition to FIG. 3, FIG. 4 also illustrates that the extent 321 of the virtual rectangle 306, which is the distance between the acceleration sensors 301 and 303 along the other centerline 310, is less than fifty percent of a subframe structure's maximum extent 311 along the lateral axis 308.

Figure 5:
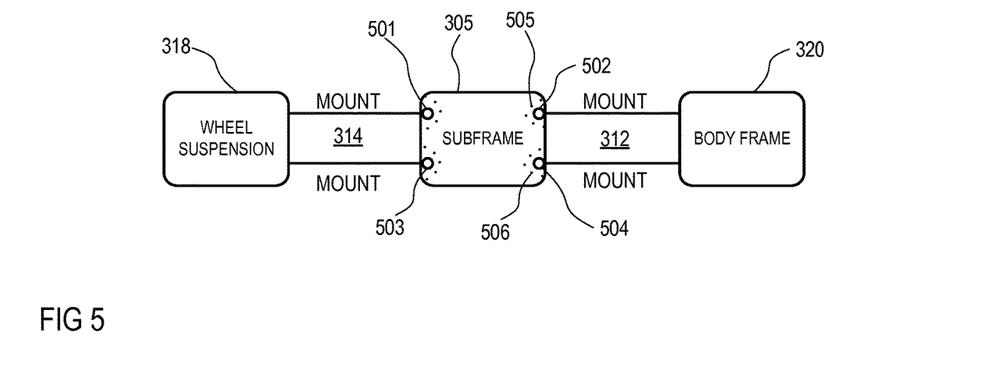
FIG. 5 is a schematic diagram illustrating positions of additional noise and vibration sensors in the noise and vibration sensor arrangement shown in FIG. 3.

Referring to FIG. 5, the noise sensor arrangement may further comprise four additional acceleration sensors 501-504 attached to the subframe 305 at positions 505 and 506 on mounts 312 and 313 or adjacent to the mounts 312 and 313 in or on the subframe structure 305. The mounts 312 and 313 are to be attached to a vehicle frame structure, which is in the present case body frame structure 320. The additional acceleration sensors 501-504 may have maximum sensitivities directed to at least one of the vehicle's (body) frame structure, the vehicle's geometrical center and the vehicle's center of gravity. The noise sensor arrangement may alternatively or further comprise additional acceleration sensors (not shown) which are attached to the subframe 305 at positions on or adjacent to a mount 314 disposed in or on the subframe structure 305. The second mount 314 may be attached to wheel suspension 318.

Figure 6:
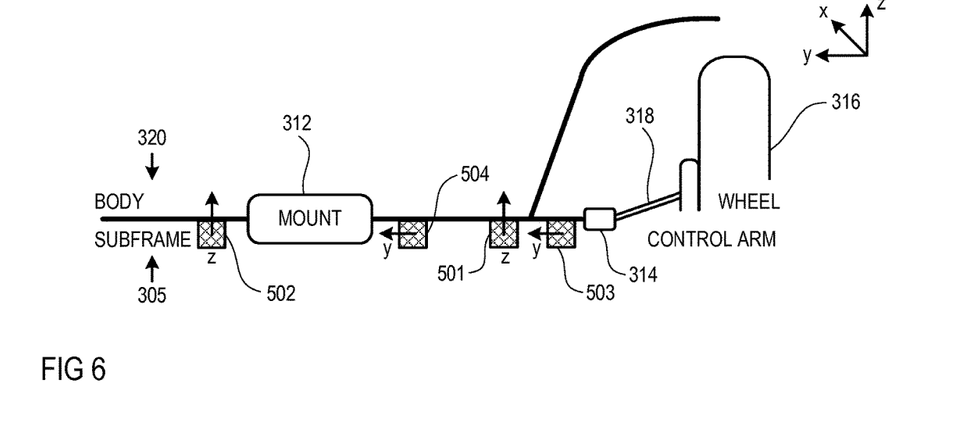
FIG. 6 is a schematic diagram illustrating an exemplary noise and vibration arrangement with additional four single-axis acceleration sensors.

As shown in FIG. 6, the additional acceleration sensors 501 and 503 may be arranged on the subframe 305 adjacent to mount 314 and may be single-axis sensors, wherein acceleration sensor 501 may have its maximum sensitivity in the z axis and acceleration sensor 503 may have its maximum sensitivity in the y axis. Furthermore, additional acceleration sensors 502 and 504 may be attached to the subframe 305 adjacent to mount 312 and may be single-axis sensors, wherein acceleration sensor 502 may have its maximum sensitivity in the z axis and acceleration sensor 504 may have its maximum sensitivity in the y axis.

Figure 7:
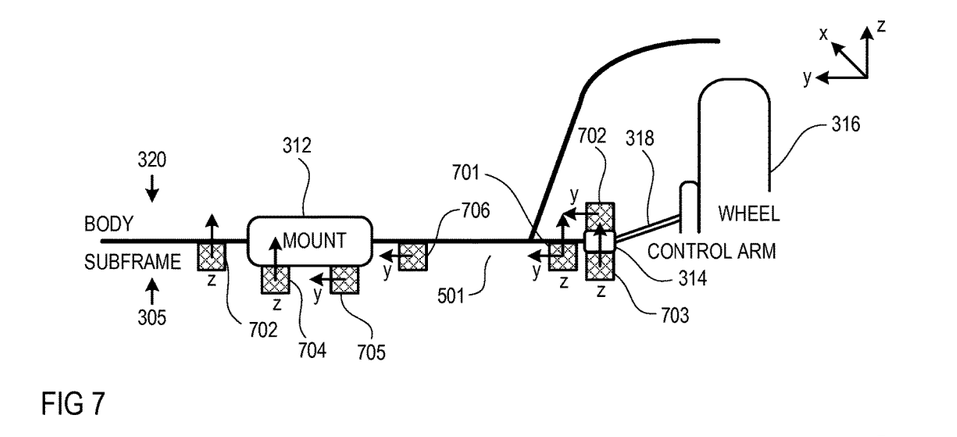
FIG. 7 is a schematic diagram illustrating an exemplary noise and vibration arrangement with additional six single-axis acceleration sensors and one double-axis acceleration sensor.

Alternatively, the additional acceleration sensors 501 and 503 of the arrangement shown in FIG. 6 may be substituted by one double-axis additional acceleration sensor 701 and two single-axis additional acceleration sensors 702 and 703 as shown in FIG. 7. Acceleration sensor 701 is attached to the subframe 305 adjacent to mount 314 and acceleration sensors 702 and 703 are attached to the mount 314 at opposing sides, e.g., on the body frame side and the subframe side. Acceleration sensor 701 may have its maximum sensitivities in the z and y axes. Acceleration sensor 702 may have its maximum sensitivity in the y axis and acceleration sensor 703 may have its maximum sensitivity in the z axis. Furthermore, the additional acceleration sensors 502 and 504 of the arrangement shown in FIG. 6 may be substituted by four single-axis additional acceleration sensors 702, 704, 705 and 706. Acceleration sensors 702 and 706 are attached to the subframe 305 adjacent to mount 312 and acceleration sensors 704 and 705 are attached to the mount 314 on the subframe side. Acceleration sensors 702 and 704 may have their maximum sensitivities in the z axis. Acceleration sensors 705 and 706 may have their maximum sensitivities in the y axis.

Figure 8:
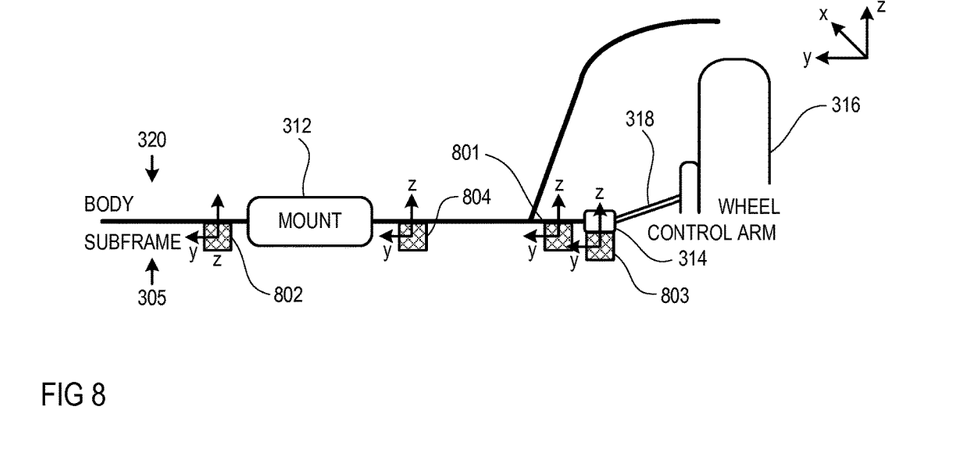
FIG. 8 is a schematic diagram illustrating an exemplary noise and vibration arrangement with additional four double-axis acceleration sensors.

In still another alternative arrangement, the additional acceleration sensors 501-504 of the arrangement shown in FIG. 6 may be substituted by four double-axis additional acceleration sensors 801-804 as shown in FIG. 8. Acceleration sensor 801 may be attached to the subframe 305 adjacent to mount 314 and acceleration sensor 803 is attached to the mount 314 at the subframe side. Additional acceleration sensors 802 and 804 may be attached to the subframe 305 adjacent to mount 312. Acceleration sensors 801-804 may have their maximum sensitivities in the y and z axis.

However, variations of the above-described sensor arrangements are possible. For example, noise sensors for global and local RNC control of structure-borne road noise may be arranged so that the maximum observability of the changes in the modal structural responses related to road noise resonances may be detected, e.g., by way of microphones in headrests of seats disposed in the cabin. Axes x, y, and z may correspond to different degrees of freedom. If noise originating from several degrees of freedom is contributing, at least two noise sensors may have axes corresponding to each degree of freedom that relates to a road noise resonance. Two noise sensors facing at two degrees of freedom may be placed between the wheel and suspension for tire cavity control. Three sensors facing at three degrees of freedom may be placed across the vehicle's subframe structure. Furthermore, two noise sensors facing at two degrees of freedom may be placed at the control arms of the suspension. For example, noise sensors for airborne road noise RNC may be arranged so that one sensor is disposed at each of the wheel arches and one sensor is disposed inside the acoustic under-sheets of the vehicle's body panel.

Referring again to FIG. 1, a noise measurement method employed to operate with an active road noise control system, e.g., the systems described above in connection with FIGS. 1 and 2, may include generating at least four output signals representative of the accelerations that occur at four sensing positions on a vehicle subframe structure. The vehicle subframe structure may have a shape that is axisymmetric with regard to a longitudinal axis and that has a maximum extent along a lateral axis, the lateral axis and the longitudinal axis being perpendicular. As illustrated, the four sensing positions on the subframe structure correspond to four corners of a virtual rectangle. The virtual rectangle has two perpendicular centerlines, one of the centerlines being in line with the longitudinal axis of the subframe structure. The extent of the virtual rectangle along the other centerline is less than fifty percent of a maximum extent of the subframe structure along its lateral axis.

The description of embodiments has been presented for purposes of illustration and description. Suitable modifications and variations to the embodiments may be performed in light of the above description or may be acquired by practicing the methods. For example, unless otherwise noted, one or more of the described methods may be performed by a suitable device and/or combination of devices. The described methods and associated actions may also be performed in various orders in addition to the order described in this application, in parallel, and/or simultaneously. The described systems are exemplary in nature, and may include additional elements and/or omit elements. The designations of the various axes (e.g. longitudinal, lateral, x, y, z etc.) used herein are only exemplary and, thus, are interchangeable as the case may be.

As used in this application, an element or step recited in the singular and proceeded with the word "a" or "an" should be understood as not excluding the plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A noise and vibration sensor arrangement configured to operate with an active road noise control system, the arrangement comprising:
    four acceleration sensors each configured to generate at least one output signal representative of at least one of accelerations, motions, and vibrations that act on the respective acceleration sensor; and
    a vehicle subframe structure having a shape that is axisymmetric with regard to a first axis and that has a maximum extent along a second axis, the first axis and the second axis being perpendicular to one another; wherein
    the four acceleration sensors are attached to the vehicle subframe structure at positions that correspond to four corners of a virtual rectangle or virtual trapezoid,
    the virtual rectangle or virtual trapezoid has two perpendicular centerlines, one of the centerlines being in line with the first axis of the vehicle subframe structure, and
    the maximum extent of the virtual rectangle or the virtual trapezoid along the other centerline is less than fifty percent of a maximum extent of the vehicle subframe structure along its second axis.

2. The noise and vibration sensor arrangement of claim 1, wherein at least one of the four acceleration sensors is a single-axis sensor having a maximum sensitivity in an axis perpendicular to the first axis, and perpendicular to the second axis or in an axis along the second axis.

3. The noise and vibration sensor arrangement of claim 1, wherein at least one of the four acceleration sensors is a double-axis sensor having a first maximum sensitivity in an axis perpendicular to the first axis and the second axis, and a second maximum sensitivity in an axis along the second axis.

4. The noise and vibration sensor arrangement of claim 1, wherein at least one of the four acceleration sensors is a triple-axis sensor.

5. The noise and vibration sensor arrangement of claim 1, wherein the vehicle subframe structure comprises flat surfaces at the positions where at least two of the four acceleration sensors are attached.

6. The noise and vibration sensor arrangement of claim 1, further comprising at least two first additional acceleration sensors attached to the vehicle subframe structure at positions on or adjacent to first mounts in or on the vehicle subframe structure, the first mounts configured to be attached to a vehicle frame structure.

7. The noise and vibration sensor arrangement of claim 6, wherein the at least two first additional acceleration sensors have a maximum sensitivity or maximum sensitivities directed to at least one of the vehicle frame structure, a vehicle's geometrical center and a vehicle's center of gravity.

8. The noise and vibration sensor arrangement of claim 6, further comprising at least two second additional acceleration sensors attached to the vehicle subframe structure at positions on or adjacent to second mounts disposed in or on the vehicle subframe structure, the second mounts configured to be attached to vehicle wheel suspensions.

9. An active road noise control system comprising a noise and vibration sensor arrangement according to claim 1, including an active road noise control module and at least one loudspeaker.

10. The active road noise control system of claim 9, further comprising at least one microphone disposed in a vehicle cabin.

11. The active road noise control system of claim 10, further comprising at least one microphone disposed in a headrest of seat in the vehicle cabin.

12. The active road noise control system of any of claim 9, wherein the active road noise control module comprises at least one adaptive filter.

13. The active road noise control system of claim 12, wherein the adaptive filter is configured to operate according to a least mean square algorithm.

14. The active road noise control system of claim 9, wherein the active road noise control module is a multi-channel processing module connected to a multiplicity of noise sensors and loudspeakers.

15. A noise and vibration measurement method configured to operate with an active road noise control system, the method comprising:
    generating at least four output signals, each output signal being representative of at least one of accelerations, motions and vibrations that occur at four sensing positions on a vehicle subframe structure; wherein
    the vehicle subframe structure has a shape that is axisymmetric with regard to a first axis and that has a maximum extent along a second axis, the first axis and the second axis being perpendicular;
    the four sensing positions on the vehicle subframe structure correspond to four corners of a virtual rectangle or virtual trapezoid,
    the virtual rectangle or virtual trapezoid has two perpendicular centerlines, one of the centerlines being in line with the first axis of the vehicle subframe structure, and
    the maximum extent of the virtual rectangle or virtual trapezoid along the other centerline is less than fifty percent of a maximum extent of the vehicle subframe structure along its second axis.

16. A noise and vibration sensor arrangement configured to operate with an active road noise control system, the arrangement comprising:
    four acceleration sensors each configured to generate at least one output signal representative of at least one of accelerations, motions, and vibrations that act on the respective acceleration sensor; and
    a vehicle subframe structure having a shape that is axisymmetric with regard to a first axis and that has a maximum extent along a second axis, the first axis and the second axis being perpendicular to one another; wherein
    the four acceleration sensors are attached to the vehicle subframe structure at positions that correspond to four corners of a virtual rectangle,
    the virtual rectangle has two perpendicular centerlines, one of the centerlines being in line with the first axis of the vehicle subframe structure, and
    the maximum extent of the virtual rectangle along the other centerline is less than fifty percent of a maximum extent of the vehicle subframe structure along its second axis.

17. The noise and vibration sensor arrangement of claim 16, wherein at least one of the four acceleration sensors is a single-axis sensor having a maximum sensitivity in an axis perpendicular to the first axis, and perpendicular to the second axis or in an axis along the second axis.

18. The noise and vibration sensor arrangement of claim 16, wherein at least one of the four acceleration sensors is a double-axis sensor having a first maximum sensitivity in an axis perpendicular to the first axis and the second axis, and a second maximum sensitivity in an axis along the second axis.

19. The noise and vibration sensor arrangement of claim 16, wherein at least one of the four acceleration sensors is a triple-axis sensor.

20. The noise and vibration sensor arrangement of claim 16, wherein the vehicle subframe structure comprises flat surfaces at the positions where at least two of the four acceleration sensors are attached.

* * * * *